United States Patent Office 3,323,580
Patented June 6, 1967

3,323,580
SYSTEM FOR CONTROLLING THE CLIMATIC CONDITIONS IN A PLURALITY OF CONTROLLED AREAS
Georg Christian Werner, Hausergarden, Hauserplads 20; Mogens Odin Clorius, 23 Joachim Ronnowsvej, Virum; and Christian Fredrik Regenburg, 4 Bernhard Bangs Alle, all of Copenhagen, Denmark
Filed Mar. 1, 1965, Ser. No. 436,075
Claims priority, application Denmark, Feb. 29, 1964, 1,021/64
8 Claims. (Cl. 165—12)

The present invention relates to air conditioning systems. More in particular, the invention relates to a method of controlling the climatic condiitons in a plurality of controlled areas, where air is supplied to the controlled areas through conduits or ducts. The term "climatic conditions" as used in this text applies primarily to control of temperature and humidity and the supply of fresh air, and it may also involve other conditions such as the ionization of the air or other factors affecting the state and composition of the air.

The requirements of heat, humidity and air within a controlled area are subject to variation from different sources, and such air conditioning systems have therefore often been designed to introduce air of different temperature and/or humidity through separate channels to produce the desired adjustment of the climatic conditions by a suitable mixture of the two air streams and by controlling the proportion thereof. This method, however, requires a double channel system and throttling of both channels for each controlled area. Such a system is therefore complicated and expensive, and moreover, the crossover between the two channel systems are extremely space-consuming.

It has been suggested to use a one-duct-channel system, but it has not hitherto been possible with such a system to achieve the advantages which are the object of the present invention, namely a method of producing in a very simple manner individual control of the climatic conditions in each of the controlled areas connected to a system, i.e., in each area it shall be possible to control, manually or automatically, the factors determining the state and composition of the air. At the same time it is desired to use a one-duct channel system with relatively simple control means and communicating with the individual controlled areas, whereby the whole system will be relatively inexpensive, yet reliable, and provides all the technical advantages with respect to control of the climatic conditions in each area that might be desired. By a one-duct channel system is here meant a system by which air having the required content of heat, humidity, etc., is directed to all areas through one main duct and its branches.

In accordance with the invention the technical advantages explained above have been achieved by directing air to the controlled areas through a one-duct channel system, subjecting the factors of air such as temperature and/or humidity to controlled predetermined variations within a range approximating the average reqirements, and by throttling the air supplied to each controlled area in a manner varying in accordance with immediate requirements and in timed relation to the controlled variation in said factors such as temperature and humidity.

It will be obvious that by using this method in a one-duct channel system it will be possible to control the climatic conditions in each controlled area, and this may even be done with a single throttle member, whereby the entire system based on the characteristic features of this method will become extremely simple.

It will be possible, as already mentioned, to control at least three different factors, but in most cases it will be desirable to feed a relatively constant amount of air to a given controlled area, or at any rate to adjust the amount of air to conditions which are entirely independent of, perhaps even conflicting with the factors determining the heat and humidity requirements. It may, for instance, be mentioned that in a room where there are few people during one period of time, and a large number of people during another period of time, a relatively large amount of heat is possibly also a relatively large amount of humidity will be required during the first time period, while during the second period the requirements of heat and normally also of humidity will be much smaller, whereas the need for air will not be smaller but, if anything, greater. Under such conditions it will therefore be expedient to provide an adjustment by which the supply of heat and if necessary also the supply of humidity are reduced when many people assemble in the room, while the supply of air is maintained constant or is controlled separately with a view to the number of people staying in the room. Therefore, according to the invention, it will be expedient to control the throttling so that the average amount of air supplied to a controlled area per unit of time has a predetermined constant or variable value independent of the amount of heat supplied. There also may be cases where the need for air varies, while the heat requirements remain substantially constant, but also this situation can be provided for by the method in accordance with the invention.

To avoid condensation or precipitation of moisture in the ducts feeding the air to the different controlled areas, the temperature and the humidity of the air may be so adjusted that the dew point of the air in the ducts is maintained below the temperature of the surfaces of the system which are contacted by the air.

It will be evident from the above that the application of the method explained herein will cause variations of the different climatic factors, while the known methods have aimed at reducing the variations to a minimum. But it has been found that the variations required for applying the method in accordance with the invention are not so large that they will cause any inconvenience.

The invention moreover relates to a system utilizing the said method and of the type comprising a one-duct channel system connected to an air conditioning center.

According to the invention the air conditioning center of this system is provided with variable means for producing controlled variations in the humidity and/or temperature of the air supplied from the center, and for each controlled area the feed channel is provided with a throttling member adjusted in conformity with the controlled variations and adapted to be controlled in response to the temperature and/or humidity of the controlled area. In the said air conditioning center a certain controlled variation of the humidity and/or temperature of the air to be fed to the controlled area is produced, and for each of the said areas there is a throttling member which is controlled partly in timed relationship with the variations in temperature and/or humidity supplied from the center and partly in response to the immediate requirements in the said area. This means that during a certain time period, for instance, relatively warm air is supplied in comparatively large quantities such as when there are but few people in the controlled area and the requirements for heat are correspondingly large. During the following time period, when the center supplies air of lower temperature, the entrance to the said area is throttled down to prevent excess cooling. But when there are many people in the room, conditions will be reversed, and the entrance for the warm air will be throttled down while a larger amount of cool air will be admitted, so that there will always be an adequate amount of fresh air in the room. For this purpose the throttling means may be adapted to be controlled also by the temperature and/or humidity of the air flowing through the channel system. Thus variations of the throttle means are in a very simple manner produced in conformity with the controlled variations of the air conditioning center.

The system may also have throttle means which are so controlled that the average amount of air supplied per unit of time is substantially independent of the amount of heat supplied. In this way the average amount of air supplied to an area will be independent of the heat or humidity requirements, or it may be adjusted so that the area receives always the required amount of fresh air, although the requirements for heat and humidity fluctuate according to quite different rules.

The application of a one-duct channel system also means a considerable saving of space, which to no small degree results from the fact that channel crossovers are entirely obviated. It should also be observed that the heat requirements may, of course, be negative, but the method and the system explained here will obviously in principle function in the same way. In order to avoid condensation of moisture in channel systems and the members connected thereto the system according to the invention may be provided with means for controlling the humidity of the supplied air so that the dew point of the air is maintained at a low figure during the first part of a warmer period, and precipitation is further restrained by means for adjusting the temperature in a manner by which each warmer period is initiated by a particularly heavy increase of temperature followed by a drop in temperature.

The throttling for the individual control areas at the respective points of the channel system may, of course, be accomplished in many different ways. However, in a preferred embodiment of the system provided in accordance with the invention where the throttle means are movable blocking members which are operated partly by mechanical, hydraulic, pneumatic, or electrical means controlled from a thermo- and/or hygro-sensing device disposed in the air feed channel, partly by such a thermostat and/or hygrostat mounted in the controlled area, the adjustment of the throttle means has been provided in a simple manner and in conformity with the variations of the air conditioning center. In this connection it is essential that although the throttle means are synchronized to the variations of the center, it will be possible to shift the phases of variation and thus obtain a dual variation, i.e., variation not only of the temperature but also of the humidity of the air according to requirements, while at the same time the amount of air is maintained constant or adjusted to a factor which is independent of the said conditions. Another simple construction is the operation of the throttle means and the control means connected with the air conditioning center by means of a clock work, whereby all the different functions can be controlled exactly as desired, though the throttle means naturally must be controlled to respond to the requirements of the controlled areas.

Often there will be relatively long distances between the air conditioning center and the different controlled areas, and it will therefore be expedient to adapt the insulation and the heat capacity of the duct system to the temperature fluctuations and air speeds so that the fluctuations are equalized only to a negligible extent during the flow of the air through the feed channels, it being obvious that the heat capacity in the channels and other members through which the air flows should be kept at a minimum, while the heat insulation should be the best possible in order to prevent loss of heat.

The character and the sequence of the variations produced at the air conditioning center should generally be adjustable to be adapted to local conditions, and even if the sequence is normally maintained for considerable periods, it will often be an advantage to be able to reverse, for instance, from summer to winter operation or vice versa.

The throttle means to be used in the individual areas may be designed in various ways, and it is obvious that by using throttle and control operated by clockworks or otherwise as mentioned above, the desired functioning may be obtained; but particularly good possibilities of variation are obtained in a simple manner by providing the throttle means with one or more control members each of which is adapted to change the throttle opening simultaneously with the controlled variations of the center and between two complementary values, and is adapted to adjust these values in response to one of the factors determining the state and composition of the air. Thus the throttle opening may be supplied with a desired, predetermined amount of air within a single sequence of the controlled variations, while the supply of heat may be varied.

The system may have throttle means each of which is provided with a plurality of control members for change and variation of the throttle opening in response to several of the factors determining the state and composition of the air, and these control means may expediently be adapted to perform the changes at a constant or variable time phase displacement whereby it will be possible to make the change in response to several factors, the adjustments of the various control members being made at different times, but still in conformity with the controlled variations.

It will be obvious that in a system of this type the possibilities of variation will be numerous and may be employed to provide a virtually ideal climatic adjustment individually in each of the areas connected to the system. As already mentioned, the control members controlling the throttling for each area may be adapted to operate with a certain time phase displacement, and by an expedient design of the air conditioning center a sequence of different air flows may be produced, the heat and humidity content and other factors of which will vary in accordance with a predetermined pattern, and in relation to such sequence the individual throttle means may be adapted to control the air introduced into the area through the throttle opening to provide in the said area the climatic conditions desired with a view to circumstances and other local influences. A further possibility of variation may be obtained by providing the throttle means with means for controlling variations of the said phase displacement in response to one of the said factors, the variations of the time phase displacement between the different control means for the throttle openings making it possible to introduce further variables so that the state and composition of the air can be adapted as desired by quite simple means and at any rate in response to four variable factors affecting the climatic conditions of the area.

As an example may be mentioned that when supplying through the channel an amount of air divided into four periods, one containing warm and dry air, the second warm and humid air, the third cold and dry air, and the fourth cold and humid air, a simple throttle arrangement may adjust the throttle opening to provide any desired temperature and humidity by admitting more warm air and less cold air when a larger supply of heat is required, and within both these periods the supply of humidity may be regulated, for instance, by providing a larger opening in the humid/warm and in the humid/cold periods and a smaller opening in the warm/dry and in the cold/dry periods. This is done simply by adjusting the throttle openings, but if variations are also made with the phase displacement between the various operations and in relation to the sequence of the controlled variations, a further variable may be obtained, for instance an adjustment of the ionization of the area.

As mentioned above, the application of the method explained here will cause repeated variations of the factors determining the climate within the areas connected to the system, but these variations, which are ranging about the desired average value, have proven to be not only harmless, but even to produce a beneficial physiologic effect. Thus it has been found that the uniformity of temperature, humidity, etc., aimed at by prior methods and systems were not favorable, but that variations within a certain range will impart a feeling of superior comfort to people staying in the room.

The invention will be explained here with reference to the drawing, where

Figure 1:
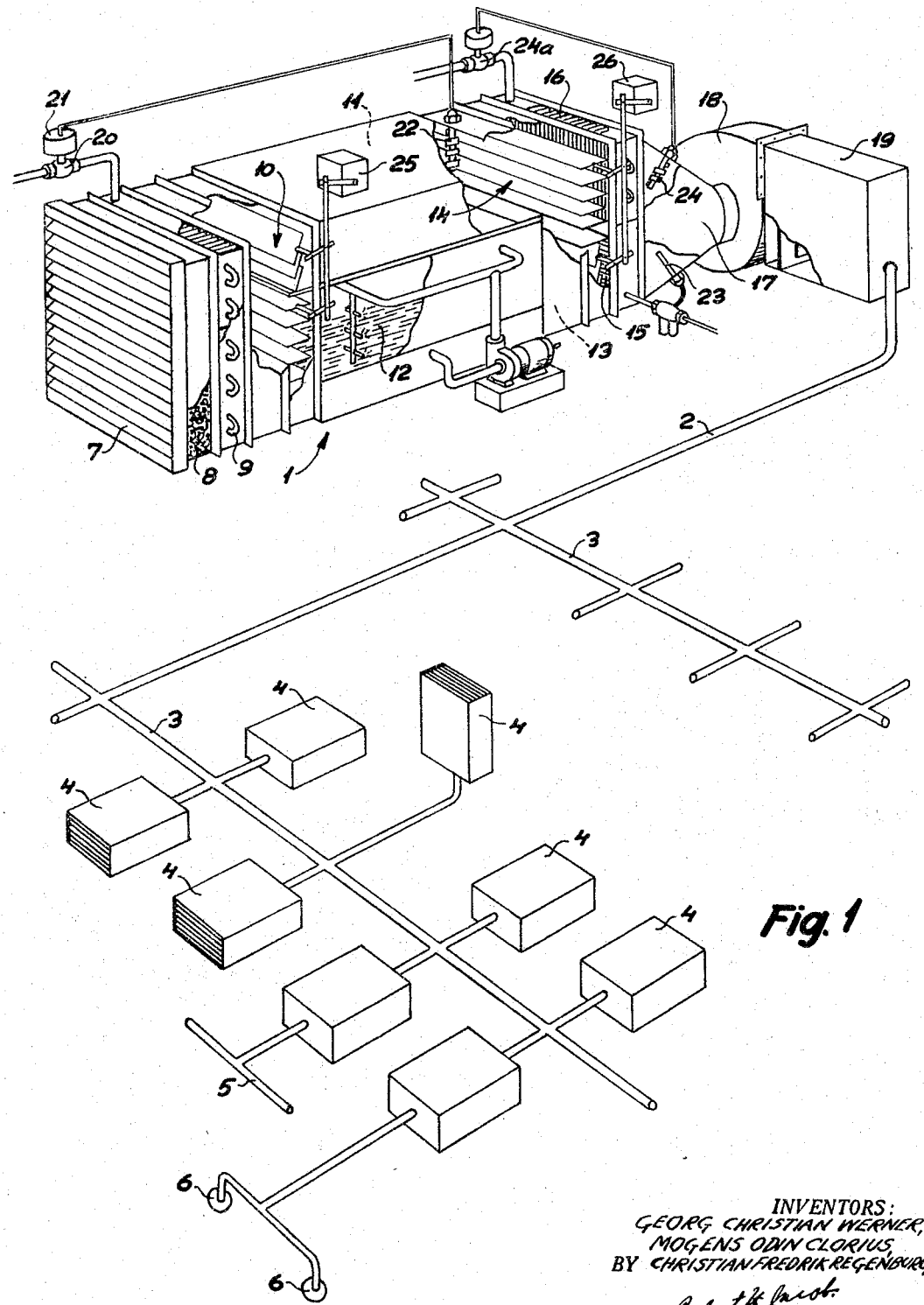
FIG. 1 shows a schematic diagram of a system according to the invention.

FIG. 1 shows a system comprising an air conditioning center 1, which is connected to a one-duct channel system 2 having a plurality of branches 3 provided with a plurality of throttle arrangements 4, and each supplying air to a control area, either direct or through a specific injection channel 5 or injection nozzles 6.

The air conditioning center or apparatus comprises a suction grid 7, an air filter 8, followed by a heating unit 9. This heating unit serves to preheat the air, which is then passed on to a throttle arrangement 10 adapted to shift the air flow between a free passage 11 and the passage through a humidifier 12. After these two passages there is a chamber 13 which receives the air from both and where it may thus be mixed if passage is permitted from both ways. From the chamber 13 the air may be passed on through a throttle arrangement 14 in which the air flow is shifted to pass either over a cooling unit 15 or a heating unit 16. From these two passageways the air is directed to a collecting chamber 17 and further to a pump 18 which through a sound lock 19 pumps the air into the channel system 2.

The heating unit 9 is controlled by means of valve 20 operated by a motor 21 which in turn is controlled by a feeler 22 mounted in the space 13, and the heating unit 9 will thus impart a suitable temperature to the air so that the subsequent heating or cooling by means of the heating or cooling units 16 and 15, respectively, may produce the desired temperature. The cooling unit 15 is controlled by means of a feeler 23 connected to a valve 24a and the heating unit 16 by means of a feeler 24, and both the feelers 23 and 24 are mounted in the output chamber 17. The two throttle means 10 and 14 are operated by synchronized timing means 25 and 26, whereby the controlled variations of temperature and humidity are produced which it is desired to transmit through a one-duct channel system 2, and here it should be noted that the timing means 25 and 26, preferably control clocks, will generally be time phase displaced relative to each other to provide a plurality of variations in the system.

Figure 2:
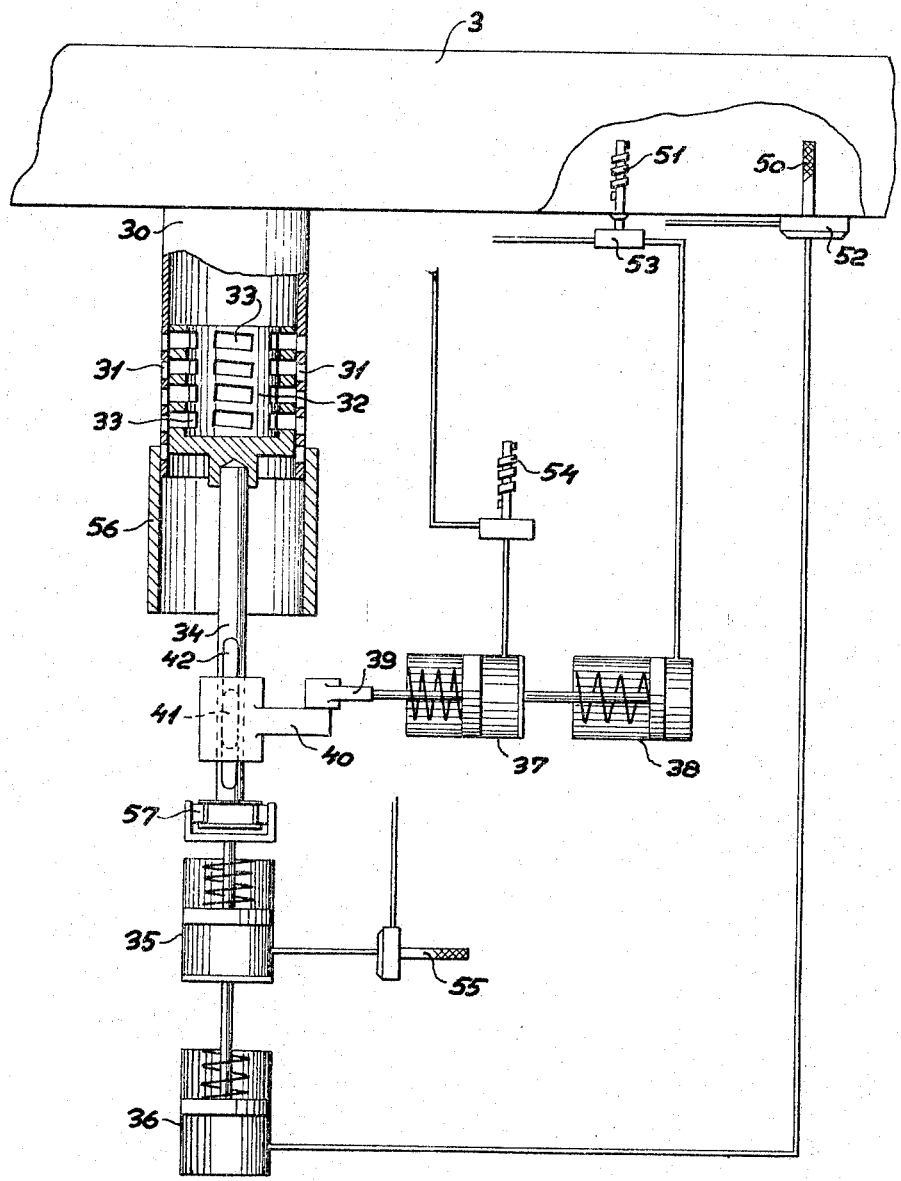
FIG. 2 illustrates an embodiment in accordance with the invention of a throttle arrangement for an area connected to a system of this type.

FIG. 2 shows a throttle arrangement connected to a branch 3, and comprising a tubular section there is a downwardly closed cylinder 32 with holes 33 corresponding to the holes 31 of the tubular section. The cylinder 32 is mounted to be axially displaceable and rotatable about its axis, both of which movements will produce variations in the flow passage for the air, which passage is defined by the overlapping portions of the holes 31 and 33.

The two movements of the cylinder 32 are produced by means of a shaft 34 secured coaxially of the cylinder and connected to means for rotating and displacing the shaft. The displacement of the shaft may also be caused by the two drive members 35 and 36, while the rotation may be caused by two drive means 37 and 38 connecting rod 39 with a crank member 40 enclosing the shaft 34 and coupled thereto by means of a pin 41 which engages a longitudinal groove 42 in the shaft 34 so that the crank member 40 can be displaced axially in relation to the shaft 34, but cannot be rotated in relation to the shaft.

In the channel 3 is mounted a humidity sensing device 50 and a temperature sensing device 51, which are connected through electrical, hydraulic, pneumatic or mechanical means, 52 and 53 respectively, to the drive members, 36 and 38 respectively, and control their functions to provide the adjustment of the throttling in response to humidity and temperature which is to take place in step with the fluctuations of these factors originating from the air conditioning center. The drive member 35 is further connected to a hygrostat 55, and the drive member 37 is connected to a thermostat 54, the hygrostat 55 and the thermostat 54 being located in the controlled area served by the throttle arrangement, thus providing the adjustment of the throttling means in accordance wtih the requirements for humidity and heat.

The drive members 35, 36, 37 and 38 may be of any convenient type, such as for instance electromotors, hydraulic or pneumatic means, and they may be provided with time delay means to control the time phase displacements between the different functions, particularly the drive members 36 and 38 actuated by the sensing devices 50 and 51. The time delay means, if any, may further be controlled by sensing means whereby the time delay is included as a possibility of providing adjustment to one additional factor in the climatic conditions.

As illustrated in FIG. 2, the throttle arrangement may further be provided with a blocking member 56 which is vertically displaceable and thereby can be made to cover some of the holes 31, thus providing an extra adjustment of the total amount of air supplied to the area.

Between the drive member 35 and the crank member 40 a clutch 57 is interposed, which permits the cylinder 32 to be rotated without rotating the drive members 35 and 36.

Having now described our invention with reference to the embodiment illustrated in the drawing, we do not wish to be limited therein, but what we desire to protect by Letters Patent of the United States is set forth in the appended claims.

We claim:

1. A system for controlling the climatic conditions in a plurality of controlled areas, such system comprising an air conditioning center, a one-duct system connected to said air conditioning center and to said plurality of controlled areas, said center including means for supplying air thereto, a preheating unit for air introduced in said conditioning center, a humidifier unit, a free passage proximate said humidifier unit, a first control means for ultimately directing air through said free passage and through said humidifier unit, an air heating unit and air cooling unit proximate said air heating unit, second control means for alternately directing the air flow to said heating unit and said cooling unit, separate means associated with ducts for each controlled area including throttling means having controls, one responsive to variations in temperature and the other responsive to variations in humidity of the area and both responsive to the timing of said controlled variations in the conditioned air supplied from said center.

2. A system for controlling the climatic conditions in a plurality of controlled areas, said system comprising an air conditioning center, a one-duct system connected to said air conditioning center and to said plurality of controlled areas, said center including means for supplying air thereto, a humidifier unit, a free passage proximate said humidifier unit, first control means for alternately directing air through said free passage and through said humidifier unit, an air heating unit, an air cooling unit proximate said air heating unit, second control means for alternately directing the air flow to said heating unit and to said cooling unit, separate means associated with the duct for each controlled area including throttling means having controls, one responsive to variations in temperature, and the other responsive to variations in humidity of the area and both timed with said controlled variations in the conditioned air supplied from said center, said throttling means comprising a stationary cylinder mounted in the controlled area and having a plurality of perforations and a movable cylinder having corresponding configurations, actuating means including drive means for displacing said movable cylinder axially and actuating means including drive means for rotating said movable cylinder relative to said stationary cylinder, and means operatively connecting one said actuating means to said control responsive to temperature variations and means operatively connecting the other said actuating means to said control responsive to variations in humidity.

3. A system for controlling the climatic conditions in a plurality of controlled areas, said system comprising an air conditioning center, a one-duct system connected to said air conditioning center and to said plurality of controlled areas, said center including means for supplying air thereto, a humidifier unit, a free passage proximate said humidifier unit, first control means for alternately directing air through said free passage and through said humidifier unit, an air heating unit, an air cooling unit proximate said air heating unit, second means for alternately directing the airflow to said heating unit and to said cooling unit, separate means associated with the duct for each controlled area including throttling means having controls, one responsive to variations in temperature, and the other responsive to variations in humidity of the area and both timed with said controlled variations in the conditioned air supplied from said center, said first control means and said second control means each including a throttle means and a control clock with means operative to move said throttle means.

4. A system for controlling the climatic conditions in a plurality of controlled areas, said system comprising an air conditioning center, a one-duct system connected to said air conditioning center and to said plurality of controlled areas, said center including means for supplying air thereto, a humidifier unit, a free passage proximate said humidifier unit, first control means for alternately directing air through said free passage and through said humidifier unit, an air heating unit, an air cooling unit proximate said air heating unit, second control means for alternately directing the air flow to said heating unit and to said cooling unit, separate means associated with the duct for each controlled area including throttling means having controls, one responsive to variations in temperature, and the other responsive to variations in humidity of the area, said controls for the throttling means being adapted to create variations in the throttle openings timed with the controlled variations in the conditioned air supplied from said center, said variations in the alternating periods being complementary to one another.

5. A system for controlling the climatic conditions in a plurality of controlled areas, said system comprising an air conditioning center, a one-duct system connected to said air conditioning center and to said plurality of controlled areas, said center including means for supplying air thereto, a humidifier unit, a free passage proximate said humidifier unit, first control means for alternately directing air through said free passage and through said humidifier unit, an air heating unit, an air cooling unit proxmate said air heating unit, second control means for alternately directing the air flow to said heating unit and to said cooling unit, separate means associated with the duct for each controlled area including throttling means having controls, one responsive to variations in temperature, the other responsive to variations in humidity of the area and both timed with said predetermined controlled variations in the conditioned air supplied from said center, said throttling means comprising a stationary cylinder mounted in the controlled area and having a plurality of perforations and a movable cylinder having corresponding perforations, actuating means including drive means for displacing said movable cylinder axially and actuating means including drive means for rotating said movable cylinder relative to said stationary cylinder, and means operatively connecting one said actuating means to said control responsive to the controlled temperature variations in the air supplied from the center and means operatively connecting the other said actuating means to said control responsive to variations in humidity in the air supplied from the center, said drive means for said actuating means connected to said control responsive to temperature variations including a thermostat control in the associated controlled area and said drive means of said actuating means connected to said control responsive to variations in humidity including a hygrostat in the associated controlled area.

6. A system in accordance with claim 5 in which said actuating means connected to the controls responsive to temperature and humidity in the controlled area are adapted for providing a mutual timed shift relationship depending on the variation in temperature and humidity.

7. A system for individually controlling the climatic conditions in a plurality of controlled areas, said system comprising: an air conditioning center, a one-duct system comprising a plurality of branch ducts for connecting said air conditioning center to said plurality of controlled areas, said air conditioning center including means for supplying air thereto, said air conditioning center further including means for effecting predetermined variations of the factors of air such as temperature and humidity at periodic intervals of time within said air conditioning center, individual throttling means associated with each branch duct serving each controlled area, individual first control means to control each of said throttling means individually to vary the flow of air periodically and in response to the said periodic intervals of time of said predetermined variations of the factors of air supplied from said air conditioning center, and individual second control means to control each of said throttling means individually in response to variations in the factors of air in each controlled area so as to obtain an average flow of air over an even number of said periodic intervals of time approximately independently of the amount of heat or humidity supplied to each controlled area.

8. A system for individually controlling the climatic conditions in a plurality of controlled areas, said system comprising: an air conditioning center, a one-duct system comprising a plurality of branch ducts for connecting said air conditioning center to said plurality of controlled areas, said air conditioning center including means for supplying air thereto, said air conditioning center further including means for effecting predetermined variations of the factors of air such as temperature and humidity at periodic intervals of time within said air conditioning center, individual throttling means associated with each branch duct serving each controlled area, individual first control means to control each of said throttling means individually to vary the flow of air periodically and in response to the said periodic intervals of time of said predetermined variations of the factors of air supplied from said air conditioning center, and individual second control means to control each of said throttling means individually and to effect further variations in the individual throttling means in timed relationship with said predetermined variations effected at said periodic intervals of time within said air conditioning center, said further variations and said predetermined variations being complementary to each other in alternating periods of time.

References Cited

UNITED STATES PATENTS

| | | | |
|---|---|---|---|
| 402,386 | 4/1889 | Baldwin | 165—48 |
| 843,909 | 2/1907 | Peters et al. | 165—20 |
| 2,107,268 | 2/1938 | Avery et al. | 165—12 |
| 2,254,185 | 8/1941 | Newton | 165—20 |
| 2,495,861 | 1/1950 | Newton | 165—12 |

ROBERT A. O'LEARY, *Primary Examiner.*

CHARLES SUKALO, *Examiner.*